No. 856,959. PATENTED JUNE 11, 1907.
W. T. HUDSON, J. R. PARKS & W. H. COURSEY.
CANDY MAKING MACHINE.
APPLICATION FILED DEC. 3, 1906.
3 SHEETS—SHEET 1.
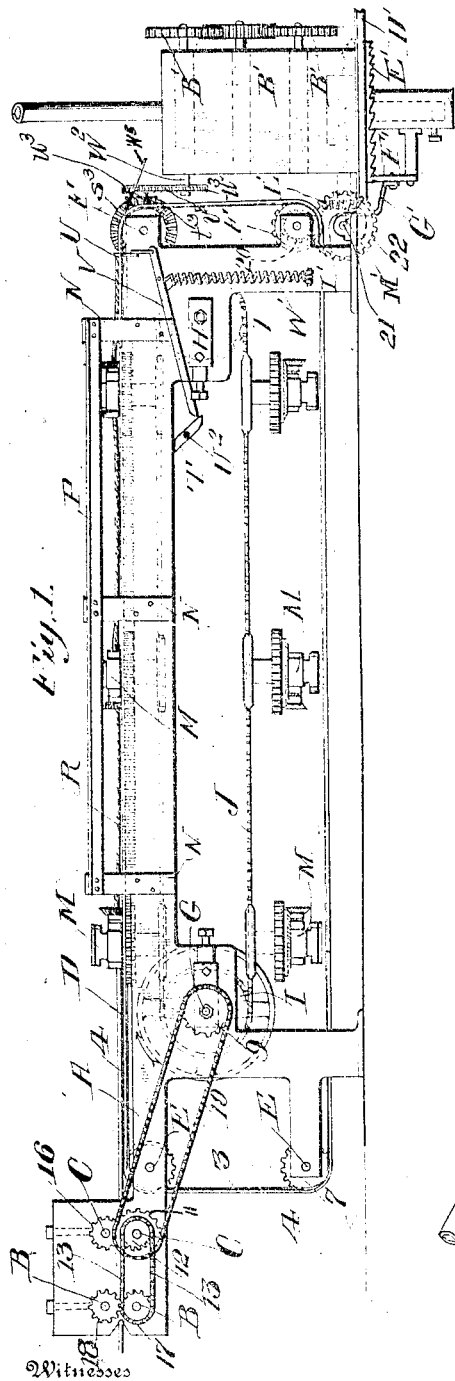
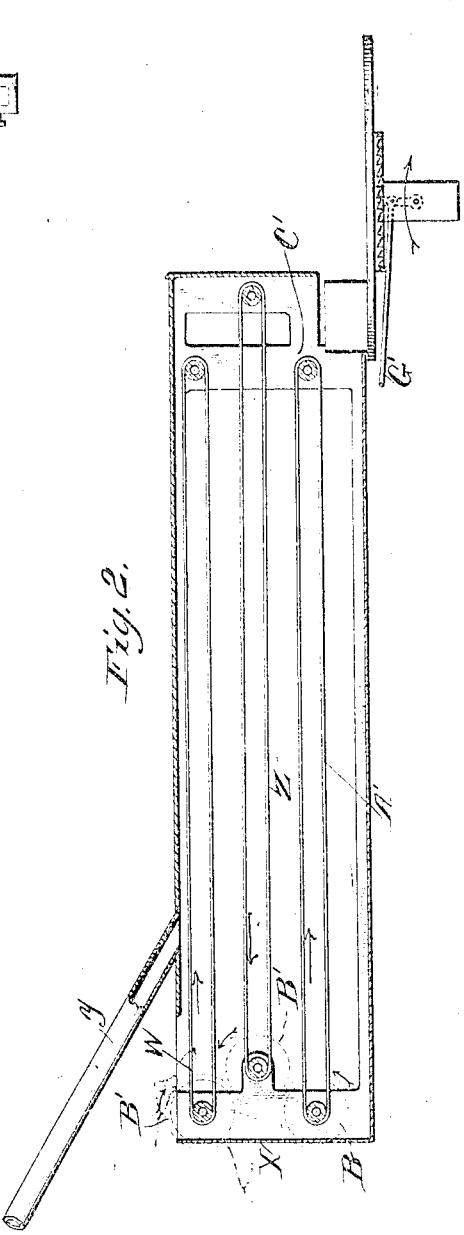
Witnesses
N. C. Healy
J. J. Sheehy Jr.
Inventors
William T. Hudson,
James R. Parks &
William H. Coursey
By James Sheehy
Attorney No. 856,959. PATENTED JUNE 11, 1907.
W. T. HUDSON, J. R. PARKS & W. H. COURSEY.
CANDY MAKING MACHINE.
APPLICATION FILED DEC. 3, 1906.
3 SHEETS—SHEET 2.
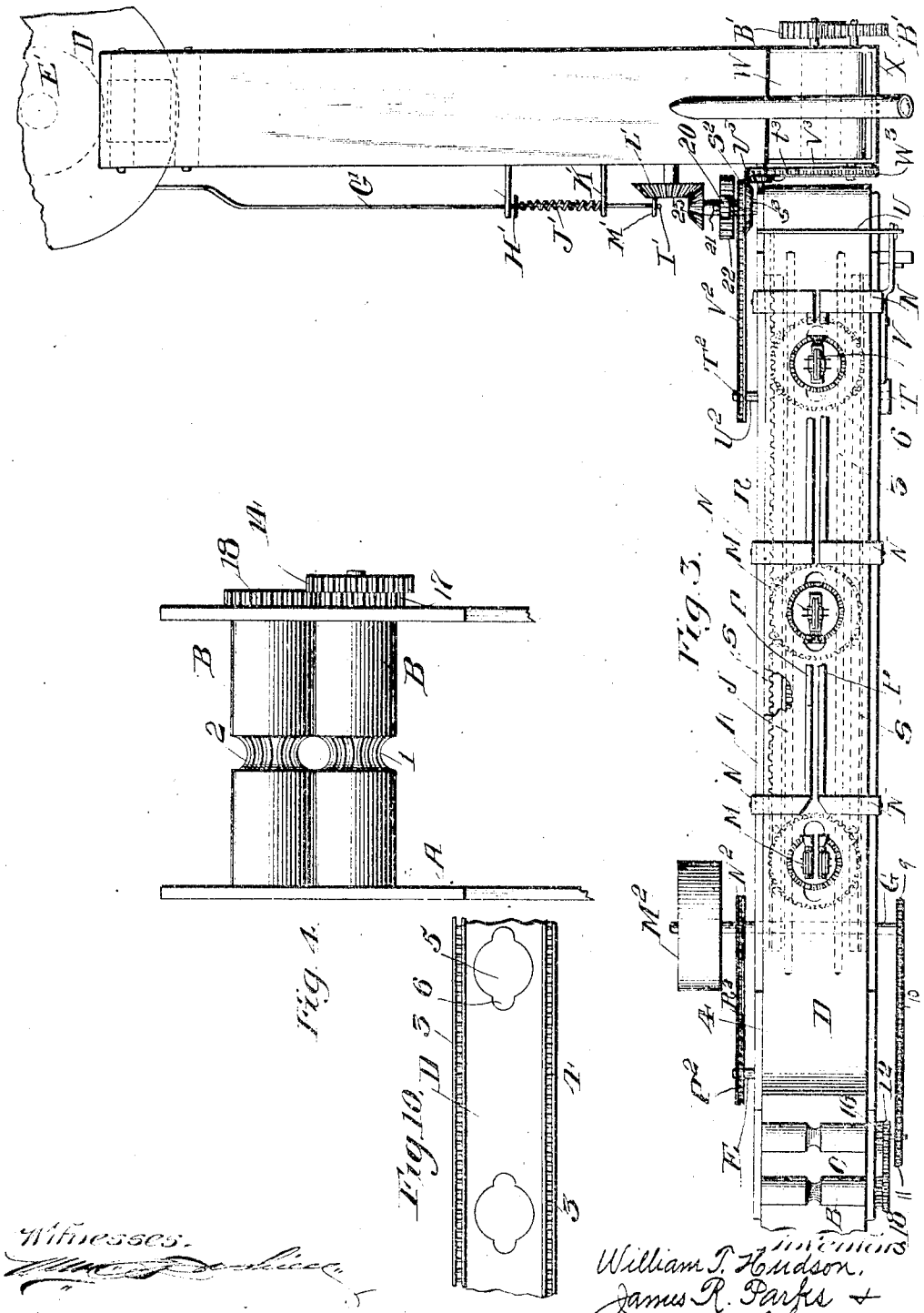

No. 856,959. PATENTED JUNE 11, 1907.
W. T. HUDSON, J. R. PARKS & W. H. COURSEY.
CANDY MAKING MACHINE.
APPLICATION FILED DEC. 3, 1906.
3 SHEETS—SHEET 3.
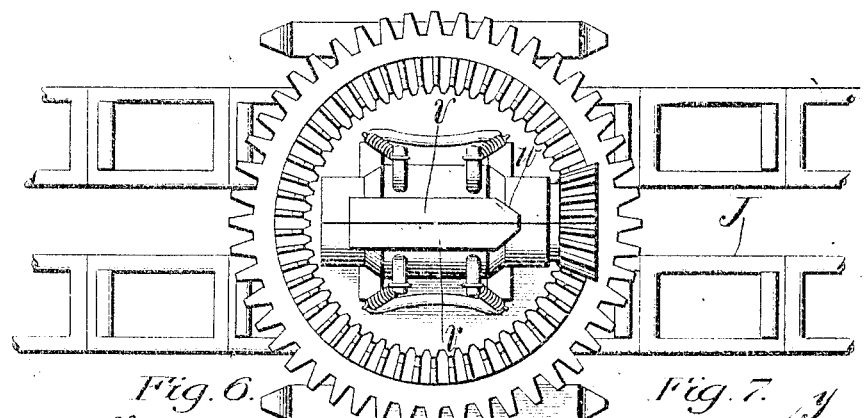
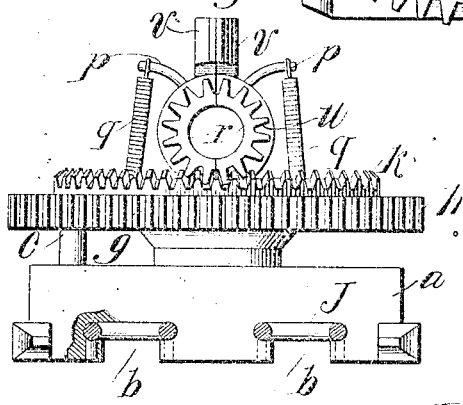
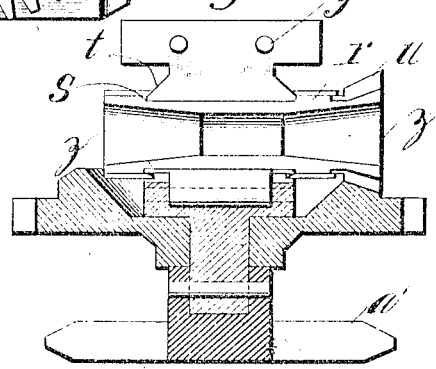
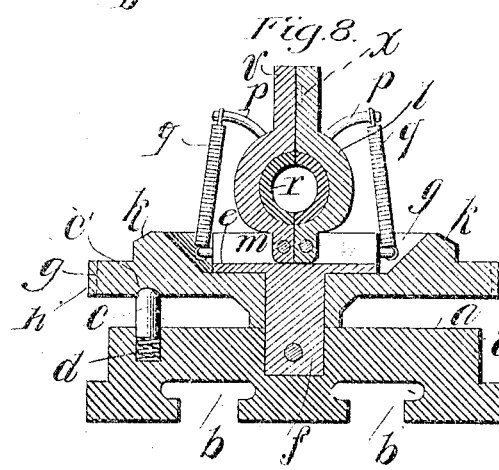
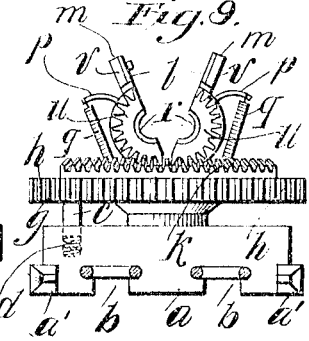
Witnesses.
Inventors
William T. Hudson,
James R. Parks &
William H. Coursey.
By James Sheehy, Atty.

UNITED STATES PATENT OFFICE.

WILLIAM T. HUDSON, JAMES R. PARKS, AND WILLIAM H. COURSEY, OF ATLANTA, GEORGIA, ASSIGNORS, BY DIRECT AND MESNE ASSIGNMENTS, OF ONE-HALF TO SAID HUDSON, ONE-THIRD TO SAID COURSEY, AND ONE-SIXTH TO WALTER E. DOBBINS, OF ATLANTA, GEORGIA.

CANDY-MAKING MACHINE.

No. 856,959.      Specification of Letters Patent.      Patented June 11, 1907.

Application filed December 3, 1906. Serial No. 346,170.

*To all whom it may concern:*

Be it known that we, WILLIAM T. HUDSON, JAMES R. PARKS, and WILLIAM H. COURSEY, citizens of the United States, residing at Atlanta, in the county of Fulton and State of Georgia, have invented new and useful Improvements in Candy-Making Machines, of which the following is a specification.

Our invention pertains to the manufacture of stick candy; and it has for one of its objects to provide a machine for reducing a mass of candy to a strip of the desired size and shape in cross-section, for twisting the strip to display the colors of the candy to the best advantage and in that way enhance the attractive appearance of the candy, and for cutting the strip into sticks of the desired length.

Another object of the invention is the provision in a machine for making stick candy, of means for receiving and cooling the sticks of candy with a view of rendering the same fit for immediate packing.

Another object of the invention is the provision in a machine for making stick candy, of means for presenting boxes or cartons to the discharge of the cooling means and for moving each box or carton when it is full away from the said discharge and another box or carton into position to receive from the said discharge; the said means for moving the boxes or cartons being so timed with reference to the remainder of the machine as to assure each box or carton being moved away from the discharge of the cooling means when said box or carton receives its full quota of candy.

Other objects of the invention will be fully understood from the following description and claims when the same are read in connection with the accompanying drawings, forming part of this specification, in which:

Figure 1 is a side elevation of the machine constituting the present and preferred embodiment of our invention, and showing more particularly that portion of the machine for reducing a mass of candy to a strip of the desired shape and size in cross-section, for twisting the strip, and for cutting the strip into sticks of the desired length. Fig. 2 is a view taken at a right angle to Fig. 1 and illustrating more particularly the means for cooling the sticks of candy and the means for presenting boxes or cartons one by one to the discharge of the cooling means at the proper times. Fig. 3 is a plan view of the machine as a whole, with certain elements partly broken away. Fig. 4 is a detail end elevation illustrating the primary rolls for reducing a mass of candy to a strip of the desired shape and size in cross-section and for moving the said strip forward. Fig. 5 is an enlarged plan view illustrating one of the twisters comprised in the machine and a portion of the belt or belts for carrying the twisters; the jaws of the twister being shown as closed. Fig. 6 is a view showing the twister in front elevation and the belts in transverse section. Fig. 7 is a longitudinal vertical section illustrating the inner side of one of the jaws of the twister in elevation. Fig. 8 is a transverse central section of the twister. Fig. 9 is a detail transverse section of the twister showing the jaws thereof as open. Fig. 10 is an inverted plan of a portion of the endless apron comprised in the machine.

Similar letters and numerals of reference designate corresponding parts in all of the views of the drawings.

For the sake of convenience we will first describe the twisters comprised in our novel machine, and inasmuch as the twisters are identical in construction a detailed description of the one shown in Figs. 5 to 9 will suffice to impart a definite understanding of all. The said twister, Figs. 5 to 9, comprises a base or body $a$ adapted at $b$ for the connection of the belts by which the twister is carried, a stop pin $c$ carried by the body $a$ and backed by a spring $d$ so as to enable it to serve a purpose hereinafter set forth in detail, a jaw-carrying body $e$ having a depending portion $f$ fixed to the body $a$; said depending portion $f$ being of circular form in cross-section, a gear $g$ mounted on said depending portion $f$ and having peripheral spur teeth $h$ and also having on its upper side a circular series of beveled teeth $k$, jaws $l$ pivotally mounted between flanges $m$ on the jaw-carrying body $e$ and having outwardly directed arms $p$, coiled springs $q$, of which two are preferably employed in connection with each jaw, interposed between and connected to the arms p and the jaw-carrying body e, and having for their function to normally open and hold the jaws in an open position, and jaw-linings r, preferably of brass, having dovetail grooves s receiving dovetail portions t on the jaws l, whereby the linings are detachably connected to the jaws and normally held in proper relation thereto, and also having at their forward ends miter gear sections u intermeshed with the beveled teeth k of the gear g. At their upper ends the jaws l are provided with shoes v the forward ends of which are beveled as indicated by w, and in its inner side one jaw is provided with sockets x while the other is provided on its inner side with protuberances y designed to enter said sockets when the jaws are closed with a view of assuring the closed jaws remaining in the proper positions relative to each other. As shown the jaw-linings r are shaped to form a bore of circular form in cross-section, Figs. 6 and 8, this in order to enable the twister to receive and twist a candy strip of circular form in cross-section, and the ends of the said jaw-linings are preferably flared as indicated by z so as to prevent said ends marring or affecting the shape in cross-section of the strip of candy. While the jaw-linings r are shaped as stated to form a bore of circular form in cross-section, it is obvious that the inner sides of the said linings may be shaped to form a bore of triangular form in cross-section or of any other form that it is desired to give the strip of candy, without involving departure from the scope of our invention as claimed. It will also be apparent that by virtue of the detachable connection of the jaw-linings r to the jaws l, linings having inner sides shaped to form bores of different forms in cross-section may be used interchangeably in the jaws l. The body a is provided at its opposite sides with pointed runners a', and these runners are designed to be moved rectilinearly in guides on the main frame incident to the upper traverse of the twister with a view of holding the body against horizontal swinging or rotation.

In the practical use of the twister described, the twister is carried by traveling belts, and at the proper time fixed bars coöperate with the shoes v to close the jaws l upon a strip of candy. The twister is then carried along by the belts, and while the body a, the jaw-carrying body e and the jaws l are held against rotation by the runners a' moving in their guides, the jaw-linings r are free to be rotated by the teeth k of the gear g coöperating with the miter gear sections u of the jaw-linings. Incident to the said rectilinear movement of the body a the gear g is rotated because of its spur gear teeth h being intermeshed with a fixed horizontal rack. When the shoes v pass out of engagement with the mentioned fixed bars, the springs q operate to pull and hold the jaws l open, and when the spur teeth h pass out of engagement with their complementary fixed rack, the spring-backed pin c enters a shallow recess c' in the under side of the gear g, Fig. 8, and in that way holds the gear g against casual movement around the portion f of the jaw-carrying body e until the shoes v again assume a position between their complementary fixed bars. We prefer to employ six of the twisters described in our machine, but we do not desire to be understood as limiting ourselves to any specific number of twisters, for the reason that the number of twisters may be varied according to the size of the machine.

A is the main frame of the machine which may be of the construction shown or of any other construction compatible with the purpose of our invention, and B B are the primary rolls for reducing a mass of candy to a strip of the desired shape and size in cross-section and for feeding the said strip forward. The said rolls B are arranged one above the other and are provided in their peripheries with matched circumferential grooves 1, preferably of semi-circular form in cross-section, Fig. 4, in which are ribs 2 having for their office to positively engage and feed the strip of candy forward. The primary rolls are preferably of brass, and as their name implies have to do with the initial reduction of the mass of candy to a strip of the desired shape and size in cross-section, as well as to feed the strip forward. C C are rolls, preferably of hard rubber, arranged one above the other at about the proportional distance illustrated in advance of the primary rolls B. These rolls C have smooth circumferential grooves corresponding in shape to the grooves of the rolls B, and their function is to smooth the strip of candy and to eradicate therefrom the marks or indentations left by the ribs 2 in the grooves of the primary rolls. From the smoothing or finishing rolls C the strip of candy passes to the upper stretch of an endless apron D. This endless apron D comprises two parallel sprocket belts 3, and a main portion 4, preferably of leather, arranged at the outer sides of and fixedly connected to the said sprocket belts. In the said leather portion 4 of the apron D are provided at suitable intervals openings 5 which are generally of circular form but are provided at diametrically opposite points and in the longitudinal center of the apron with offsets 6 for a purpose which will presently appear.

E E are shafts journaled in the main frame A and arranged one above the other and slightly in advance of the smoothing rollers C, and F F are shafts arranged one above the other in the said frame A at the opposite end thereof. These shafts E and F are provided adjacent to their ends with sprocket gears 7, and on these sprocket gears 7 and engaged with the teeth thereof are the sprocket belts 3 of the apron D from which it follows that when one of the said shafts is rotated, the apron will be positively moved in the direction desired.

G and H are transverse shafts journaled in the main frame A and bearing sprocket gears I, and J J are sprocket belts which are mounted on the said sprocket gears. It is these sprocket belts that carry the several twisters before described in detail, and by reference to Fig. 1 it will be seen that the said twisters are lettered M. In addition to the sprocket gears I, the shaft G is provided with a sprocket gear 9 which latter is connected to a sprocket belt 10 with a sprocket gear 11 on the shaft of the lower roll C, which lower roll shaft is provided with another sprocket gear 12 connected through a sprocket belt 13 with a sprocket gear 14 fixed on the shaft of the lower roll B. From this it follows that when the shaft G is rotated the lower roll C will also be rotated as will also the lower roll B, and as the lower roll C has a spur gear (not shown) back of the sprocket gear 11 and intermeshed with a spur gear 16 on the upper roll C, it will be seen that the upper roll C as well as the lower roll C will be positively rotated. The lower roll B also has a spur gear 17, and this spur gear is intermeshed with a spur gear 18 on the upper roll B so that the upper roll B will also be positively rotated.

Fixed to uprights N rising from the main frame A are longitudinal bars P which are arranged at opposite sides of and adjacent to the longitudinal center of the machine. These bars P are designed and adapted to coöperate with the shoes $v$ of the twisters M and to close the jaws $l$ of the twisters subsequent to the twisters assuming positions on the upper stretches of the belts J and in their respective openings 5 in the leather portion of the endless apron D. In this connection it will be understood that as each twister M passes upward around the sprocket gears on the shaft G it will assume a position in and extend upward through its respective opening 5 in the apron D, and after each twister is in this position relative to the apron D the shoes $v$ of the twister pass into engagement with the fixed bars P. The said engagement of the shoes $v$ with the bars P results in the jaws $l$ being closed upon the strip of candy, and the jaws are held in their closed position until the shoes $v$ pass out of engagement with the forward ends of the bars P when the springs $q$ will operate to open the jaws of the twister and enable the same to pass downward and out of engagement with the strip of candy.

R is a horizontal rack supported on and fixed with respect to the main frame A and having its spur teeth on its inner side. This fixed rack R is arranged to engage the spur teeth $h$ of each twister M immediately subsequent to the closing of the jaws of the twister on the strip of candy, and from this it follows that during the traverse of each twister between the fixed bars P, the gear $g$ of the twister will be rotated and motion will be transmitted from the beveled teeth $k$ of said gear to the miter gear sections $u$ of the jaw-linings $r$ with the result that the said jaw-linings $r$ and the strip of candy which they grasp will be twisted throughout the said traverse.

S S are fixed longitudinal guides on which the runners $a'$ of the twisters M move while the twisters are on the upper stretches of the endless belts J. The said longitudinal guides S serve in combination with the runners $a'$ to hold the bodies $a$ of the twisters M against rotation without interfering with the free rotation of the gears $g$ of the twisters.

T, Fig. 1, is a rotary cam mounted in the main frame A.

U is a transversely arranged knife pivoted at one end to the main frame A and extending across the path of the strip of candy on the apron D.

V is a vertically swinging lever fulcrumed at an intermediate point of its length on the main frame A and having its forward arm connected to the knife U and its rear arm arranged to be engaged and depressed by the cam T, and W is a coiled spring connected to the forward arm of lever V and to the main frame A at a point below the said lever.

The cam T which is rotated through a driving connection hereinafter described, is so timed as to engage and depress the rear arm of the lever V and then suddenly release the said arm at the proper time to insure the knife being actuated to cut the candy when the proper length of candy strip has been fed forward beyond the knife.

The knife U is actuated in the following manner, viz: the depression of the rear arm of the lever V raises the forward arm of said lever and the knife U, and then when the cam T releases the rear arm of the lever, the spring W' which is stretched or placed under tension by the raising of the forward arm of the lever, operates to quickly and forcibly pull down the forward arm of the lever and with it the knife U. In this connection it will be remembered that the nature of candy is such that forcible depression of the knife will certainly result in the proper length of candy to form a stick being severed from the strip of candy at the point where the knife strikes.

After the strip of candy is formed and twisted in the manner described, and a stick of candy is cut from the forward end of the strip the said stick of candy passes on a chute $W^5$ to the uppermost endless carrier W of the cooling means comprised in our machine. The said cooling means comprises a casing X extending at a right angle from the forward end of the main frame A and containing the endless carrier W, a conduit Y leading from a suitable source of supply (not shown) and designed to conduct cold air or any other suitable cooling agent into the casing X, an endless carrier Z arranged below and extending beyond one end portion of the carrier W, and an endless carrier A' arranged below and extending beyond the opposite end of the carrier Z. Adjacent shafts on which the carriers W, Z and A' are mounted are equipped with intermeshed spur gears B', Fig. 2, and hence it will be apparent that when one of the shafts, the upper shaft for instance, is rotated in the direction indicated by arrow, the upper carrier W will be moved in the same direction, as also indicated by arrow, the next lower carrier Z will be moved in the opposite direction, and the lowermost carrier A' will be moved in the first mentioned direction. From this it follows that each stick of candy received on the carrier W will be carried in one direction lengthwise of the casing X and will be discharged from the said carrier W to the carrier Z by which it will be carried in the casing and lengthwise thereof in the opposite direction, and that the candy will be discharged from the said carrier Z to the lowermost carrier A' by which it will be carried in the casing lengthwise thereof to the point C' at which it is discharged from the casing. Incident to the described tortuous passage of the sticks of candy through the casing X in the presence of cold air or other cooling agent, it will be seen that the sticks of candy are cooled to such an extent that when they reach the point of discharge C' they are in a condition that fits them for immediate packing.

With a view of presenting boxes or cartons to the discharge of the cooling means, and for moving said boxes or cartons away from said discharge when the same receive the proper quantity of sticks of candy, I provide the mechanism best shown in Figs. 1 and 3 of the drawings. This mechanism comprises a rotatable platform D' on which the boxes or cartons are designed to be placed in a circular series and so that the boxes or cartons will be presented to and moved away from the discharge C' of the cooling means in succession and step by step, a circular rack E' fixed to the under side of the platform D' and having beveled teeth disposed as shown, a pawl F' arranged when moved in the direction indicated by arrow in Fig. 2 to engage the rack E' and thereby rotate the platform D' through a part of a circle, and also arranged when moved in the direction opposite to that indicated by arrow to ride idly over the teeth of the rack, a rod G' connected to the pawl F' and having an enlargement H' at an intermediate point of its length, and also having an angular arm I' at its rear end, a coiled spring J' surrounding the rod G' and interposed between the enlargement H' thereof and a fixed abutment K', and a wheel L' having a lateral stud M' arranged off its center and in position to engage the arm I' of the rod G'. From this it will be apparent that when the wheel L' is rotated in the proper direction the stud M' engaging the arm I' will draw the rod G' rearward and in that way compress the spring J' so that when the stud M' passes out of engagement with and quickly releases the arm I', the spring will impel the rod G' and the pawl F' forward and result in the before-mentioned quick movement of the platform D' and the boxes or cartons thereon through a part of a circle. The wheel L' is preferably in the form of a miter gear, and it derives motion from the lower shaft F through the medium of a pinion 20 on said lower shaft F, and a shaft 21 journaled in the main frame A and equipped with a spur gear 22 intermeshed with the pinion 20, and a miter gear 23 intermeshed with the wheel L'.

The power to drive our novel machine is preferably applied to the shaft G through a band pulley $M^2$, and motion is transmitted from said shaft G to the upper of the shafts E through the medium of a sprocket gear $N^2$ on shaft G, a sprocket gear $P^2$ on the mentioned shaft E, and a sprocket belt $R^2$ connecting the said sprocket gears $N^2$ and $P^2$, all as best shown in Fig. 3.

The cam T is driven from the upper shaft F through a sprocket gear $S^2$ on shaft F, a sprocket gear $T^2$ on the cam shaft $U^2$ and a sprocket belt $V^2$ connecting said sprocket gears $S^2$ and $T^2$.

The shaft $W^2$ carrying the upper spur gear B' and complementary to the upper carrier W of the cooling means is driven from the upper of the shafts F through the medium of the driving connection illustrated in Fig. 3, which driving connection is formed by a miter gear $s^3$ on the upper shaft F, a miter gear $t^3$ intermeshed with said gear $s^3$, a sprocket gear $u^3$ fixed with the gear $t^3$ on a stub shaft journaled in the frame of the cooling means, and a belt $v^3$ connecting said sprocket gear $u^3$ with a sprocket gear $w^3$ on the same shaft as the upper spur gear B'.

While we prefer to employ the driving connections illustrated and described for transmitting motion between the various parts of our novel machine, we do not desire to be understood as confining ourselves to the said driving connections or to any other specific driving connections as driving connections or gearing of any construction and arrangement compatible with the purpose of our invention may be employed without involving departure from the scope of the invention as claimed.

An important feature of our invention resides in the arrangement of the plurality of twisters M relative to each other as shown in Figs. 1 and 3 of the drawings. By reference to the said figures it will be apparent that while the bevel gear sections $u$ of the jaw linings $r$ in one twister M are arranged at the forward ends of the jaw linings, the bevel gear sections $u$ of the jaw linings $r$ in the following twister M are arranged at the rear ends of the jaw linings, and that this arrangement of the bevel gear sections is continued in all of the twisters employed. From this it follows that when any two of the twisters are in engagement with the fixed bars P and the fixed rack R, the jaw linings of one twister will twist the strip of candy in one direction while the jaw linings of the other twister will simultaneously twist the strip of candy in the opposite direction.

It will be gathered from the foregoing that our novel machine is adapted to expeditiously reduce a mass of candy to a continuous strip of the shape and size desired in cross-section, and is also adapted to twist the strip, cut the strip into sticks of suitable length, cool the sticks and deposit the same in boxes or cartons and this in one continuous operation. From this it will be apparent that the machine requires but two attendants, one to keep the batch of candy in shape on a table or the like (not shown) so as to facilitate the passage of the candy between the primary rolls B, and the other to place empty boxes or cartons on and remove filled boxes or cartons from the platform D'.

We have entered into a detailed description of the construction and relative arrangement of the parts comprised in the present and preferred embodiment of our invention in order to impart a definite understanding of the said embodiment. We do not desire, however, to be understood as confining ourselves to the said specific construction and relative arrangement of parts as such changes or modifications may be made in practice as fairly fall within the scope of the appended claims without involving departure from the spirit of our invention.

Having described our invention, what we claim and desire to secure by Letters-Patent, is:

1. A machine for manufacturing stick candy, comprising means for twisting a strip of candy, traveling means carrying the twisting means, means for causing the twisting means to grasp the strip of candy, means for actuating the twisting means during the travel thereof, and means for releasing the twisting means from the strip of candy.

2. A machine for manufacturing stick candy, comprising means for twisting a strip of candy, traveling means carrying the twisting means, means for closing the twisting means on the strip of candy, means for actuating the twisting means during the travel thereof, and means for opening the twisting means to release the strip of candy.

3. A machine for manufacturing stick candy, comprising a belt, means carried by the belt for twisting a strip of candy, means for causing the twisting means to grasp the strip of candy, means for actuating the twisting means during the travel thereof, and means for releasing the twisting means from the strip of candy.

4. A machine for manufacturing stick candy, comprising a belt, means carried by the belt for twisting a strip of candy, means for closing the twisting means on the strip of candy, means for actuating the twisting means during the travel thereof, and means for opening the twisting means to release the strip of candy.

5. A machine for manufacturing stick candy, comprising means for twisting a strip of candy, arranged to travel with the strip, means for moving the twisting means, means for putting the twisting means during its movement in engagement with the strip, means for actuating the twisting means during the travel thereof, and means for disengaging the twisting means during its movement, from the strip.

6. A machine for manufacturing stick candy, comprising traveling means arranged to carry a strip of candy, means for twisting the strip of candy, arranged to travel with the strip, means for moving the twisting means, means for putting the twisting means during its movement in engagement with the strip, means for actuating the twisting means during the travel thereof, and means for disengaging the twisting means during its movement, from the strip.

7. A machine for manufacturing stick candy, comprising an endless apron arranged to carry a strip of candy, a belt, means for twisting the strip of candy, carried by the belt, means for putting the twisting means during its movement with the belt in engagement with the strip, means for actuating the twisting means during the travel thereof, and means for disengaging the twisting means during its movement with the belt, from the strip.

8. A machine for manufacturing stick candy, comprising an endless apron arranged to carry a strip of candy and having an opening, a belt, means for twisting the strip of candy, carried by the belt and arranged to pass through the opening in the apron, means for putting the twisting means during its movement with the belt in engagement with the strip, means for actuating the twisting means during the travel thereof, and means for disengaging the twisting means during its movement with the belt, from the strip.

9. A machine for manufacturing stick candy, comprising traveling means for carrying a strip of candy, means for twisting the strip of candy, traveling means carrying the said twisting means, and means for actuating the twisting means during the travel thereof.

10. A machine for manufacturing stick candy, comprising an endless apron for carrying a strip of candy, a belt, means for twisting the strip of candy, carried by the belt, and means for actuating the twisting means during the travel thereof.

11. A machine for manufacturing stick candy, comprising an endless apron arranged to carry a strip of candy and having an opening, a belt, means for twisting the strip of candy, carried by the belt and arranged to pass through the opening in the apron, and means for actuating the twisting means during the travel thereof.

12. A machine for manufacturing stick candy, comprising rolls for reducing a mass of candy to a strip of desired shape and size in cross-section, an endless apron arranged to carry the strip of candy, a belt, means carried by the belt for twisting the strip of candy, means for actuating the twisting means during the travel thereof, means for closing the twisting means on the strip of candy, and means for opening the twisting means to release the strip of candy.

13. In a machine for manufacturing stick candy, means for twisting a strip of candy, means for causing the twisting means to grasp the strip of candy, and means for releasing the twisting means from the strip of candy.

14. A machine for manufacturing stick candy, comprising an endless apron for carrying a strip of candy, means for twisting a strip of candy during lengthwise movement thereof, and means for dividing the twisted strip of candy into sticks while said strip is on the endless apron.

15. In a machine for manufacturing stick candy, the combination of means for moving a strip of candy, means for twisting the strip of candy during the movement thereof, means for causing the twisting means to grasp the strip of candy, and means for releasing the twisting means from the strip of candy.

16. In a machine for manufacturing stick candy, the combination of traveling means for supporting a strip of candy, traveling means for twisting the strip of candy, means for causing the twisting means to grasp the strip of candy, and means for releasing the twisting means from the strip of candy.

17. In a machine for manufacturing stick candy, the combination of traveling means for supporting a strip of candy, traveling means for twisting the strip of candy, means for causing the twisting means to grasp the strip of candy, means for releasing the twisting means from the strip of candy, and means for dividing the candy strip into sticks subsequent to the release of the twisting means from said strip.

18. In a machine for manufacturing stick candy, the combination of means for reducing a mass of candy to a strip of desired size and shape in cross-section, traveling means for supporting the formed strip, traveling means for twisting the strip of candy, means for causing the twisting means to grasp the strip of candy, and means for releasing the twisting means from the strip of candy.

19. In a machine for manufacturing stick candy, the combination of means for reducing a mass of candy to a strip of desired size and shape in cross-section, traveling means for supporting the formed strip, traveling means for twisting the strip, means for causing the twisting means to grasp the strip of candy, means for releasing the twisting means from said strip, and means for dividing the strip into sticks subsequent to the release of the twisting means from the strip.

20. A machine for manufacturing stick candy comprising means for moving a strip of candy in the direction of its length, and means for twisting the strip of candy about its axis during the lengthwise movement thereof.

21. A machine for manufacturing stick candy, comprising an endless apron for carrying a strip of candy, said apron having an opening, a belt, means for twisting the strip of candy, carried by the belt and arranged to pass through the opening in the apron, means for putting the twisting means during its movement with the belt in engagement with the strip, means for actuating the twisting means during the travel thereof, means for disengaging the twisting means during its movement with the belt, from the strip, and means for dividing the twisted strip into sticks while said strip is still on the endless apron.

22. A machine for manufacturing stick candy comprising rolls for reducing a mass of candy to a strip of desired shape and size in cross-section, an endless apron arranged to carry the strip of candy, a belt, means carried by the belt for twisting the strip of candy, means for causing the twisting means to grasp the strip of candy, and means for releasing the twisting means from the strip of candy.

23. A machine for manufacturing stick candy comprising rolls for reducing a mass of candy to a strip of desired shape and size in cross-section, an endless apron arranged to carry the strip of candy, a belt, means carried by the belt for twisting the strip of candy, means for causing the twisting means to grasp the strip of candy, means for releasing the twisting means from the strip of candy, and means for dividing the strip into sticks subsequent to the release of the twisting means from the strip.

24. In a machine for manufacturing stick candy, the combination of a main frame, a belt, a twister carried by the belt, means for closing the twister and holding the same closed during a part of its movement with the belt, cooperating means on the frame and the twister for operating the latter during a part of its movement with the belt, and means for opening the said twister.

25. In a machine for manufacturing stick candy, the combination of means for moving a strip of candy in the direction of its length, means for twisting the strip of candy, movable with the strip in the direction of the length thereof, traveling means carrying the twisting means, means for operating the twisting means while the latter is in engagement with the strip, means for putting the twisting means into engagement with the strip, and means for disengaging the twisting means from the strip.

26. In a machine for manufacturing stick candy, the combination of a frame, a rack fixed with respect thereto, a movable twister having jaws and rotatable linings therein and also having means for opening the jaws and a gear for engaging the rack of the frame and coöperating with the rotatable linings of the jaws to rotate said linings, and means for closing the jaws of the twister incident to movement thereof.

27. In a machine for manufacturing stick candy, the combination of a frame, a fixed rack, fixed longitudinal bars, and a movable twister comprising jaws having shoes arranged to enter and move beween the fixed bars, rotatable linings in the jaws, means for opening the jaws when the shoes thereof pass out of engagement with the fixed bars, and a gear for engaging the fixed rack and coöperating with the rotatable linings of the jaws to rotate said linings.

28. In a machine for manufacturing stick candy, the combination of a frame, a fixed rack, fixed longitudinal bars, and a movable twister comprising jaws having shoes arranged to enter and move between the fixed bars, rotatable linings in the jaws provided with miter-gear sections, means for opening the jaws when the shoes thereof pass out of engagement with the fixed bars, and a gear having spur teeth to engage the fixed rack and also having beveled teeth intermeshed with the miter-gear sections of the rotatable jaw linings.

29. In a machine for manufacturing stick candy, the combination with a twister comprising jaws, means for opening the jaws, rotatable linings in the jaws, and a gear for coöperating with and rotating said linings; of means for moving the twister rectilinearly, means for closing the jaws of the twister incident to said movement thereof, and means for rotating the gear of the twister during the rectilinear movement of the twister.

30. In a machine for manufacturing stick candy, the combination of a frame, a fixed rack, fixed longitudinal bars, a belt, and a movable twister carried by the belt and comprising a body having runners arranged to be guided in the frame, jaws pivoted to the body and having shoes arranged to enter and move between the fixed bars, springs for opening the jaws when the shoes thereof are out of engagement with the fixed bars, rotatable linings in the jaws provided with miter-gear sections, and a gear rotatable on the body and having spur teeth to engage the fixed rack and also having beveled teeth intermeshed with the miter-gear sections of the rotatable jaw linings.

31. In a machine for manufacturing stick candy, the combination of a frame, means for reducing a mass of candy to a strip of desired size and shape in cross-section, an endless apron mounted in the frame and having openings at intervals in its length; said apron being arranged to support the strip of candy on its upper stretch, a belt also mounted in the main frame, twisters carried by the said belt and timed to extend through the openings in the apron, means for causing the said twisters to grasp the strip of candy, means for operating the twisters while the same are moving with the strip of candy, and means for releasing the twisters from the strip of candy.

32. In a machine for manufacturing stick candy, the combination of a frame, means for reducing a mass of candy to a strip of desired size and shape in cross-section, an endless apron mounted in the frame and having openings at intervals in its length; said apron being arranged to support the strip of candy on its upper stretch, a belt also mounted in the main frame, twisters carried by the said belt and timed to extend through the openings in the apron, means for causing the said twisters to grasp the strip of candy, means for operating the twisters while the same are moving with the strip of candy, means for releasing the twisters from the strip of candy, and means for dividing the strip into sticks of desired length subsequent to the release of the strip from the twisters.

33. In a machine for manufacturing stick candy, the combination of means for twisting a strip of candy, means for moving the said twisting means, and means for actuating the twisting means during the said movement thereof.

34. In a machine for manufacturing stick candy, the combination of means for producing sticks of candy, cooling means comprising a casing having a discharge, means for supplying a cooling agent to said casing, and carrying means arranged in said casing in position to receive the sticks of candy from the producing means and convey the same in a tortuous course to the discharge, a rotary platform arranged to move a circular series of boxes or cartons one by one toward and away from the discharge of the cooling means, and means for rotating the said platform step by step.

35. In a machine for manufacturing stick candy, the combination of means for reducing a mass of candy to a strip of desired size and shape in cross-section, means for twisting the said strip in one direction, and means for twisting the strip in the opposite direction.

36. In a machine for manufacturing stick candy, the combination of a frame, an endless carrier, twisters carried by the endless carrier and having means for grasping a strip of candy, coöperating means on the frame and one twister for rotating the candy grasping means of said twister in one direction, and coöperating means on the frame and the following twister for rotating the candy grasping means of the latter twister in the opposite direction.

37. In a machine for manufacturing stick candy, the combination of rectilinearly movable means for twisting a strip of candy, means for so moving the said twisting means, and means for actuating the twisting means during rectilinear movement thereof.

38. In a machine for manufacturing stick candy, the combination of a rectilinearly movable twister having rotary means arranged to receive a strip of candy, means for moving the twister rectilinearly, and means for coöperating with the twister during rectilinear movement thereof to rotate the rotary candy-receiving means of the twister.

39. In a machine for manufacturing stick candy, the combination of a twister comprising a gear, rotary means for receiving a strip of candy, arranged to derive motion from the gear, means for moving the twister, and means arranged to coöperate with and rotate the gear of the twister during movement of the twister.

40. In a machine for manufacturing stick candy, a fixed rack, in combination with a twister comprising a spur gear for intermeshing with the fixed rack, and rotary means intermeshed with said gear and arranged to receive a strip of candy, and means for moving the twister.

41. In a machine for manufacturing stick candy, the combination with a twister comprising a gear, jaws, means for opening the jaws, and jaw linings arranged to derive rotary motion from the gear; of means for moving the twister, means arranged to coöperate with and rotate the gear of the twister during movement of said twister, and means for closing the jaws of the twister during movement of the twister.

42. In a machine for manufacturing stick candy, the combination of means arranged to twist a strip of candy in one direction, and means arranged to twist the strip of candy in the opposite direction.

43. In a machine for manufacturing stick candy, the combination of a frame, an endless apron mounted in the frame and having an opening; said apron being arranged to support a strip of candy on its upper stretch, a belt also mounted in the frame, a twister carried by the belt and timed to extend through the opening in the apron, means for causing the twister to grasp the strip of candy, means for operating the twister while same is moving with the strip of candy, means for releasing the twister from the strip of candy, and means for dividing the strip into sticks of desired length subsequent to the release of the strip from the twister.

44. In a machine for manufacturing stick candy, the combination of a twister comprising a gear, and rotary means for receiving a strip of candy, having one of its ends engaged with and arranged to derive motion from the gear, a following twister comprising a gear and rotary means for receiving a strip of candy, having its opposite end engaged with and arranged to derive motion from the gear, traveling means carrying the twisters, and means for rotating the gears of the twisters in a common direction during the travel thereof.

45. In a machine for manufacturing stick candy, the combination of a twister comprising a spur gear, and rotary means for receiving a strip of candy, intermeshed at one end with and arranged to derive motion from the spur gear, a following twister comprising a spur gear, and rotary means for receiving a strip of candy, intermeshed at its opposite end with and arranged to derive motion from the spur gear, traveling means carrying the twisters, and a fixed rack for rotating the spur gears of the twisters in a common direction during the travel thereof.

In testimony whereof we have hereunto set our hands in presence of two subscribing witnesses.

WILLIAM T. HUDSON.
JAMES R. PARKS.
WILLIAM H. COURSEY.

Witnesses:
J. D. ADAMS,
G. C. WATSON.